3,149,109
CERTAIN 4-TRIFLUOROMETHYL-2-(OXY/THIO) PYRIMIDINES
Kurt J. Rorig, Glenview, and Hans A. Wagner, Skokie, Ill., assignors to G. D. Searle & Co., Chicago, Ill., a corporation of Delaware
No Drawing. Filed Feb. 20, 1962, Ser. No. 174,400
6 Claims. (Cl 260—251)

This invention relates to certain 4-trifluoromethyl-2-(oxy/thio) pyrimidines and processes for the preparation thereof. More particularly, this invention relates to new and useful chemical compounds of the formula

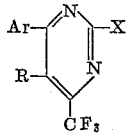

wherein Ar represents an aryl radical or an aromatic monovalent heterocyclic radical; X represents a hydroxy, mercapto, alkylthio, or alkylsulfonyl radical; and R represents hydrogen or an alkyl radical.

Among the aryl and aromatic monovalent heterocyclic radicals represented by Ar, especially phenyl, tolyl (o-, m-, or p-), naphthyl (1- or 2-), thienyl (2- or 3-), and furyl (2- or 3-) groupings are preferred. The alkyl constituents of the alkylthio radicals represented by X, as also the alkyl groupings represented by R, are most desirably of lower order, for example, methyl, ethyl, propyl, isopropyl, butyl, isobutyl, sec-butyl, tert-butyl, pentyl, neopentyl, hexyl, isohexyl, heptyl, and like —$C_nH_{2n+1}$ radicals wherein $n$ represents a positive integer less than 8.

The compounds to which this invention relates are useful because of their valuable pharmacological properties. Thus, they inhibit the incorporation of mevalonic acid during biosynthesis of cholesterol; and they are antibiotics effective, inter alia, against bacteria such as *B. subtilis*, *E. coli*, and *D. pneumoniae*, fungi such as *Trichophyton mentagrophytes*, algae such as *Chlorella vulgaris*, and cotyledenous seed germination. Further, they are adapted to counteract the heat, swelling, and rubor characteristic of the inflammatory response to tissue injury.

Preparation of the subject compounds proceeds in part by heating an appropriate dione of the formula

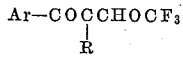

with a pseudourea of the formula

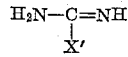

in acid alcoholic medium to give the corresponding pyrimidine

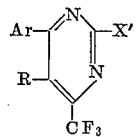

Ar and R in the foregoing formulas retaining the meanings previously assigned and X' representing a hydroxy, mercapto, or alkylthio radical. The 2-alkylthiopyrimidines so produced are converted to corresponding alkylsulfonyl compounds hereof by peracetic acid oxidation in acetic acid solution.

The following examples describe in detail compounds illustrative of the present invention and methods which have been devised for their preparation. However, the invention is not to be construed as limited thereby, either in spirit or in scope, since it will be apaprent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*4-Trifluoromethyl-2-Hydroxy-5-Methyl-6-Phenylpyrimidine*

A mixture of 23 parts of 4,4,4-trifluoro-2-methyl-1-phenyl-1,3-butanedione, 6 parts of urea, 150 parts of 95% ethanol, and 10 parts of concentrated hydrochloric acid is heated at the boiling point under reflux for 6 hours, then allowed to stand refrigerated overnight. The crystals which precipitate are filtered out, washed on the filter with a mixture of water and ether, and dried in air. The product thus isolated is 4-trifluoromethyl-2-hydroxy-5-methyl-6-phenylpyrimidine, the melting point of which is above 300°, and which has the formula

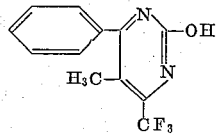

EXAMPLE 2

*4-Trifluoromethyl-2-Mecapto-5-Methyl-6-Phenylpyrimidine*

A mixture of 230 parts of 4,4,4-trifluoro-2-methyl-1-phenyl-1,3-butanedione, 76 parts of thiourea, 1500 parts of 95% ethanol, and 100 parts of concentrated hydrochloric acid is heated at the boiling point under reflux for 6 hours, then concentrated by evaporation to approximately one-third its original volume. From the concentrate, on refrigeration, there precipitates a crystalline material which, filtered off and recrystallized from ether, affords 4-trifluoromethyl-2-mercapto-5-methyl-6-phenylpyrimidine melting at approximately 140–141°. The product has the formula

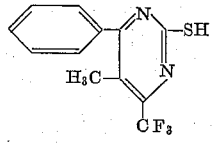

EXAMPLE 3

*4-Trifluoromethyl-2-Methylthio-6-Phenylpyrimidine*

A mixture of 324 parts of 4,4,4-trifluoro-1-phenyl-1,3-butanedione, 282 parts of 2-methyl-2-thiopseudouronium sulfate, 2250 parts of 95% ethanol, and 50 parts of concentrated hydrochloric acid is heated at the boiling point under reflux for 4 hours, then cooled and neutralized with aqueous potassium carbonate. The white precipitate which thereupon forms is filtered off, washed with water, dried in air, and extracted with ether. Upon evaporation of solvent from the ether extract and recrystallization of the residue from ether, one obtains 4-trifluoromethyl-2-methylthio-6-phenylpyrimidine melting at approximately 75°. The product has the formula

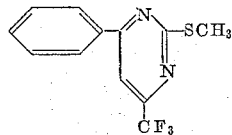

EXAMPLE 4

*4-Trifluoromethyl-2-Methylthio-6-Thienylpyrimidine*

A mixture of 23 parts of 4,4,4-trifluoro-1-(2-thienyl)-1,3-butanedione, 28 parts of 2-methyl-2-thiopseudouronium sulfate, 225 parts of 95% ethanol, and 5 parts of concentrated hydrochloric acid is heated at the boiling point under reflux for 4 hours, then cooled and adjusted to a pH of 8 with aqueous potassium carbonate. Subsequent dilution with water results in precipitation of a solid which, filtered off, washed with water, dried over phosphorous pentoxide, and recrystallized from anhydrous ether, melts at approximately 65°. The material thus isolated is 4-trifluoromethyl-2-methylthio-6-(2-thienyl)pyrimidine, the formula of which is

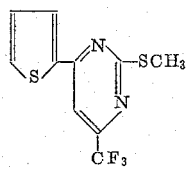

Substitution of 33 parts of 4,4,4-trifluoro-1-(3-thienyl)-1,3-butanedione [preparable by Claisen condensation of methyl 3-thienyl ketone with ethyl trifluoroacetate according to the technique of Reid and Calvin, J. Amer. Chem. Soc., 72, 2948 (1950)] for the 4,4,4-trifluoro-1-(2-thienyl)-1,3-butanedione called for in the preceding paragraph affords, by a procedure otherwise identical, 4-trifluoromethyl-2-methylthio-6-(3-thienyl)pyrimidine, having the formula

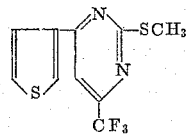

EXAMPLE 5

*4-Trifluoromethyl-6-Furyl-2-Methylthiopyrimidine*

Substitution of 33 parts of 4,4,4-trifluoro-1-(2-furyl)-1,3-butanedione for the 4,4,4-trifluoro-1-(2-thienyl)-1,3-butanedione called for in the first paragraph of Example 4 affords, by the procedure there detailed, 4-trifluoromethyl-6-(2-furyl)-2-methylthiopyrimidine melting at approximately 54°, the formula of which is

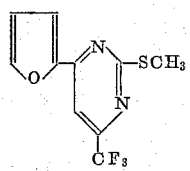

Substitution of 33 parts of 4,4,4-trifluoro-1-(3-furyl)-1,3-butanedione [preparable by Claisen condensation of 3-furyl methyl ketone with ethyl trifluoroacetate according to the technique of Reid and Calvin, J. Amer. Chem. Soc., 72, 2948 (1950)] for the 4,4,4-trifluoro-1-(2-thienyl)-1,3-butanedione called for in the first paragraph of Example 4 affords, by the procedure there detailed, 4-trifluoromethyl-6-(3 - furyl)-2-methylthiopyrimidine, having the formula

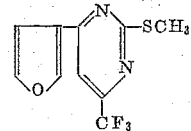

EXAMPLE 6

*4-Trifluoromethyl-2-Methylsulfonyl-6-phenylpyrimidine*

To a solution of 27 parts of 4-trifluoromethyl-2-methylthio-6-phenylpyrimidine in 200 parts of glacial acetic acid is added, slowly and with agitation, 38 parts of a 40% solution of peracetic acid in glacial acetic acid, the reaction temperatures being kept below 60° by intermittent cooling. When the addition is complete, the reaction mixture is allowed to stand at room temperatures overnight, then poured into 2000 parts of water. The precipitate which forms is let stand for 2 hours, then filtered off and consecutively washed with water, aqueous 5% sodium bicarbonate, and water again, and dried in air, whereupon it is recrystallized from ethanol to give 4-trifluoromethyl-2-methylsulfonyl-6-phenylpyrimidine melting at approximately 151–152°. The product has the formula

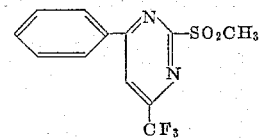

EXAMPLE 7

*4-Trifluoromethyl-2-Methylsulfonyl-6-(2-thienyl)-Pyrimidine*

Substitution of 27 parts of 4-trifluoromethyl-2-methylthio-6-(2-thienyl)pyrimidine for the 4-trifluoromethyl-2-methylthio-6-phenylpyrimidine called for in Example 6 affords, by the procedure there detailed, 4-trifluoromethyl-2-methylsulfonyl-6-(2-thienyl)pyrimidine melting at approximately 148° and having the formula

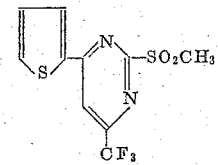

EXAMPLE 8

*4-Trifluoromethyl-6-(2-Furyl)-2-Methylsulfonyl-pyrimidine*

Substitution of 39 parts of 4-trifluoromethyl-6-(2-furyl)-2-methylthiopyrimidine and 57 parts of a 40% solution of peracetic acid in glacial acetic acid for the 27 parts of 4-trifluoromethyl-2-methylthio-6-phenylpyrimidine and 38 parts of 40% peracetic acid in glacial acetic acid, respectively, called for in Example 6 affords, by the procedure there detailed, 4-trifluoromethyl-6-(2-furyl)-2-methylsulfonylpyrimidine melting at approximately 128° and having the formula

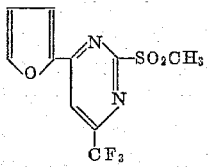

What is claimed is:
1. A compound of the formula

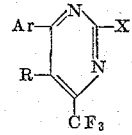

wherein Ar represents a member of the group consisting of phenyl, thienyl, and furyl radicals; X represents a member of the group consisting of hydroxy, mercapto, methylthio, and methylsulfonyl radicals; and R represents a member of the group consisting of hydrogen and the methyl radical.

2. 4 - trifluoromethyl - 2 - hydroxy - 5 - methyl - 6-phenylpyrimidine.

3. 4 - trifluoromethyl - 2 - mercapto - 5 - methyl - 6-phenylpyrimidine.

4. 4 - trifluoromethyl - 2 - methylthio - 6 - phenylpyrimidine.

5. 4 - trifluoromethyl - 2 - methylthio - 6 - (2 - thienyl)pyrimidine.

6. 4 - trifluoromethyl - 6 - (2 - furyl) - 2 - methylsulfonylpyrimidine.

References Cited in the file of this patent

Yale: J. Medicinal and Pharm. Chem., vol 1, No. 2 (1959), page 121 of pages 121 to 133.

Brooks et al.: J. Chem. Soc., London (1950), pages 452, 456–7 of pages 452–9.

UNITED STATES PATENT OFFICE
CERTIFICATE OF CORRECTION

Patent No. 3,149,109            September 15, 1964

Kurt J. Rorig et al.

It is hereby certified that error appears in the above numbered patent requiring correction and that the said Letters Patent should read as corrected below.

In the heading to the printed specification, title of invention, for "CERTAIN 4-TRIFLUOROMETHYL-2-(OXY/THIO) PYRIMIDINES" read -- CERTAIN 4-TRIFLUOROMETHYL-2-(OXY/THIO)-PYRIMIDINES --; column 1, line 11, for "(oxy/thio) pyrimidines" read -- (oxy/thio)pyrimidines --; lines 47 to 49, the formula should appear as shown below instead of as in the patent:

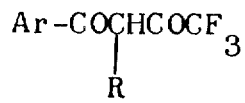

$$\text{Ar-CO}\underset{R}{\overset{}{\text{C}}}\text{HCOCF}_3$$

Signed and sealed this 6th day of April 1965.

(SEAL)
Attest:

ERNEST W. SWIDER            EDWARD J. BRENNER
Attesting Officer            Commissioner of Patents